(12) United States Patent
Tagawa et al.

(10) Patent No.: US 9,475,488 B2
(45) Date of Patent: Oct. 25, 2016

(54) CONTROL SYSTEM FOR HYBRID DRIVE UNIT

(71) Applicant: Toyota Jidosha Kabushiki Kaisha, Toyota-shi Aichi-ken (JP)

(72) Inventors: Yohsuke Tagawa, Toyota (JP); Shunya Kato, Seto (JP); Atsushi Tabata, Okazaki (JP); Tatsuya Imamura, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/566,196

(22) Filed: Dec. 10, 2014

(65) Prior Publication Data

US 2015/0158481 A1 Jun. 11, 2015

(30) Foreign Application Priority Data

Dec. 10, 2013 (JP) ................................ 2013-254882

(51) Int. Cl.
| | |
|---|---|
| B60W 20/30 | (2016.01) |
| B60W 10/10 | (2012.01) |
| B60W 10/26 | (2006.01) |
| B60W 10/06 | (2006.01) |
| B60W 20/13 | (2016.01) |
| B60W 20/00 | (2016.01) |

(52) U.S. Cl.
CPC ............. *B60W 20/30* (2013.01); *B60W 10/06* (2013.01); *B60W 10/10* (2013.01); *B60W 10/26* (2013.01); *B60W 20/13* (2016.01); *B60W 20/106* (2013.01); *Y02T 10/6239* (2013.01); *Y02T 10/7005* (2013.01); *Y02T 10/7077* (2013.01); *Y10S 903/93* (2013.01)

(58) Field of Classification Search
USPC ...................................... 701/51–66
See application file for complete search history.

(56) References Cited

U.S. PATENT DOCUMENTS

| | | | | |
|---|---|---|---|---|
| 6,081,042 | A * | 6/2000 | Tabata ................... | B60K 6/365 180/65.25 |
| 8,123,643 | B2 * | 2/2012 | Tabata ................... | B60K 6/445 475/150 |
| 2009/0055073 | A1 * | 2/2009 | Matsubara et al. .......... | 701/102 |
| 2012/0190499 | A1 * | 7/2012 | Oba .............................. | 477/115 |
| 2014/0248991 | A1 * | 9/2014 | Harada ................... | B60K 6/445 477/3 |
| 2014/0371964 | A1 * | 12/2014 | Kitahata ................ | B60K 6/445 701/22 |
| 2015/0021110 | A1 | 1/2015 | Ono et al. | |
| 2015/0051769 | A1 * | 2/2015 | Maruyama et al. ............ | 701/22 |
| 2015/0073673 | A1 * | 3/2015 | Hata et al. ....................... | 701/68 |
| 2015/0224980 | A1 * | 8/2015 | Tabata .................. | B60W 10/06 477/5 |

FOREIGN PATENT DOCUMENTS

| | | |
|---|---|---|
| JP | 2010-143511 A | 7/2010 |
| JP | 2011-255889 A | 12/2011 |
| WO | 2013114594 A1 | 8/2013 |

\* cited by examiner

*Primary Examiner* — Adam Tissot
*Assistant Examiner* — Timothy Nesley
(74) *Attorney, Agent, or Firm* — Dinsmore & Shohl LLP (57) ABSTRACT

A control system for a hybrid drive unit for avoiding an overcharging and an over discharging of a battery when starting or stopping an engine. The control system selects a speed ratio where an amount of an electric power to be stored into the battery is large or to be discharged from the electric storage device is small if a state of charge of the battery is lower than a first threshold value (at step S4). The control system selects a speed ratio where an amount of an electric power to be discharged from the battery is large or to be stored into the battery is small if a state of charge of the electric storage device is higher than a second threshold value (at step S7).

4 Claims, 8 Drawing Sheets

| | | | | C1 | B1 | MG1 | MG2 |
|---|---|---|---|---|---|---|---|
| EV | Forward/Backward | Single Motor | Drive | | | G | M |
| | | | Engine Braking | △ | △ | G | M |
| | | Dual Motor | | ○ | ○ | M | M |
| HV | Forward/Backward | High | | | ○ | G | M |
| | | Low | | ○ | | G | M |

○: Engaged   △: Selectively Engaged To Apply Engine Braked
G: Mainly Generator   M: Mainly Motor But Generator At Re-Generation

Fig. 9

CONTROL SYSTEM FOR HYBRID DRIVE UNIT

The present invention claims the benefit of Japanese Patent Application No. 2013-254882 filed on Dec. 10, 2013 with the Japanese Patent Office, the disclosure of which is incorporated herein by reference in its entirety.

BACKGROUND

1. Field of the Invention

The present invention relates to the art of a control system for a hybrid drive unit in which a rotational speed or a power generation amount of a motor-generator serving as a prime mover is changed in accordance with a speed ratio of a transmission connected to an output side of an engine.

2. Discussion of the Related Art

JP-A-2011-255889 describes a hybrid drive system having a power distribution device comprised of a first rotary element to which an engine power is applied, a second rotary element connected with a first motor-generator, and a third rotary element connected with an output member connected with a second motor generator. In the hybrid drive system taught by JP-A-2011-255889, an engine speed is changed by controlling a speed of the first motor-generator. In the hybrid drive system of this kind, an engine operating point can be controlled in a fuel efficient manner by controlling a speed of the first motor generator. To this end, the first motor-generator is operated as a motor, and a second motor-generator is operated as a generator at high speed range, but a power circulation may be caused. According to the teachings of JP-A-2011-255889, therefore, a transmission is interposed between the engine and the power distribution device, and a speed ratio of the transmission is changed according to a vehicle speed, so as to prevent the first motor-generator to be operated as a motor at high vehicle speed.

In the hybrid drive system taught by JP-A-2011-255889, the engine speed is changed responsive to a change in the speed of the first motor-generator. That is, the engine can be cranked and stopped by the first motor-generator. When starting or stopping the engine, rotational speeds of rotary members including the first motor-generator are changed. In this situation, both motor-generators generate powers, or one of the motor-generators regenerates a power in an amount of change in an inertial energy changed in accordance with the change in the rotary members. Therefore, if a large amount of electric power is generated under a condition that a battery is charged sufficiently, the battery may be overcharged and damaged. In contrast, if the electric power is discharged overly from the battery to start or stop the engine under the condition that a state of charge of the battery is insufficient, the battery may also be damaged by such an over discharging.

The present invention has been conceived noting the foregoing technical problems, and it is therefore an object of the present invention is to provide a control system for a hybrid drive unit to prevent an overcharging and an over discharging of an electric storage device when starting and stopping an engine.

SUMMARY OF THE INVENTION

The control system of the present invention is applied to a hybrid drive unit comprised of: an engine; a motor having a generating function; a power distribution device adapted to perform a differential action among a first rotary element connected with the engine, a second rotary element connected with the motor, and a third rotary element connected with an output member; a transmission adapted to change a speed ratio that is arranged between the engine and the power distribution device; and an electric storage device that is electrically connected with the motor. In order to achieve the above-explained objective, according to the present invention, the control system is configured to select the speed ratio of the transmission where an amount of an electric power to be stored into the electric storage device is large or to be discharged from the electric storage device is small if a state of charge of the electric storage device is lower than a first threshold value, and to select the speed ratio of the transmission where an amount of an electric power to be discharged from the electric storage device is large or to be stored into the electric storage device is small if a state of charge of the electric storage device is higher than a second threshold value that is larger than the first threshold value, when starting or stopping the engine while transmitting a torque of the motor to the engine.

The control system is further configured to calculate the amount of the electric power to be stored into or to be discharged from the electric storage device when starting or stopping the engine, based on an amount of change in a rotational speed of any of the rotary members connected with the power distribution device or the transmission.

The transmission includes a geared transmission comprising at least three rotary elements, that is adapted to establish a first gear stage by connecting any two of the rotary elements, and to establish a second gear stage by stopping a rotation of any one of the rotary elements.

The state of charge of the electric storage device includes a charging rate or a voltage in the electric storage device.

As described, in the hybrid drive unit to which the control system is applied, the transmission is disposed between the engine and the power distribution device connected with the motor having a generating function. According to the present invention, therefore, the amount of the electric energy to be discharged from or to be stored into the electric storage device can be changed when starting or stopping the engine by changing a speed ratio of the transmission. For this reason, an overcharging and an over discharging of the electric storage device can be avoided when starting or stopping the engine by changing the speed ratio in accordance with the state of charge of the electric storage device.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 2 (a) is a nomographic diagram showing statuses of the rotary members before starting the engine in the stopping vehicle;

FIG. 2 (b) is a nomographic diagram showing statuses of the rotary members when starting the engine under a direct drive stage in the stopping vehicle;

FIG. 2 (c) is a nomographic diagram showing statuses of the rotary members when starting the engine under a speed increasing stage in the stopping vehicle;

FIG. 3 (a) is a nomographic diagram showing statuses of the rotary members before starting the engine in the running vehicle;

FIG. 3 (*b*) is a nomographic diagram showing statuses of the rotary members when starting the engine under the direct drive stage in the running vehicle;

FIG. 3 (*c*) is a nomographic diagram showing statuses of the rotary members when starting the engine under the speed increasing stage in the running vehicle;

FIG. 4 (*a*) is a nomographic diagram showing statuses of the rotary members under a condition that the direct drive stage has been established before stopping the engine in the stopping vehicle;

FIG. 4 (*b*) is a nomographic diagram showing statuses of the rotary members under a condition that the speed increasing stage has been established before stopping the engine in the stopping vehicle;

FIG. 4 (*c*) is a nomographic diagram showing statuses of the rotary members after stopping the engine in the stopping vehicle;

FIG. 5 (*a*) is a nomographic diagram showing statuses of the rotary members under a condition that the direct drive stage has been established before stopping the engine in the running vehicle;

FIG. 5 (*b*) is a nomographic diagram showing statuses of the rotary members under a condition that the speed increasing stage has been established before stopping the engine in the running vehicle;

FIG. 5 (*c*) is a nomographic diagram showing statuses of the rotary members after stopping the engine in the running vehicle;

DETAILED DESCRIPTION OF THE PREFERRED EMBODIMENT(S)

Figure 7:
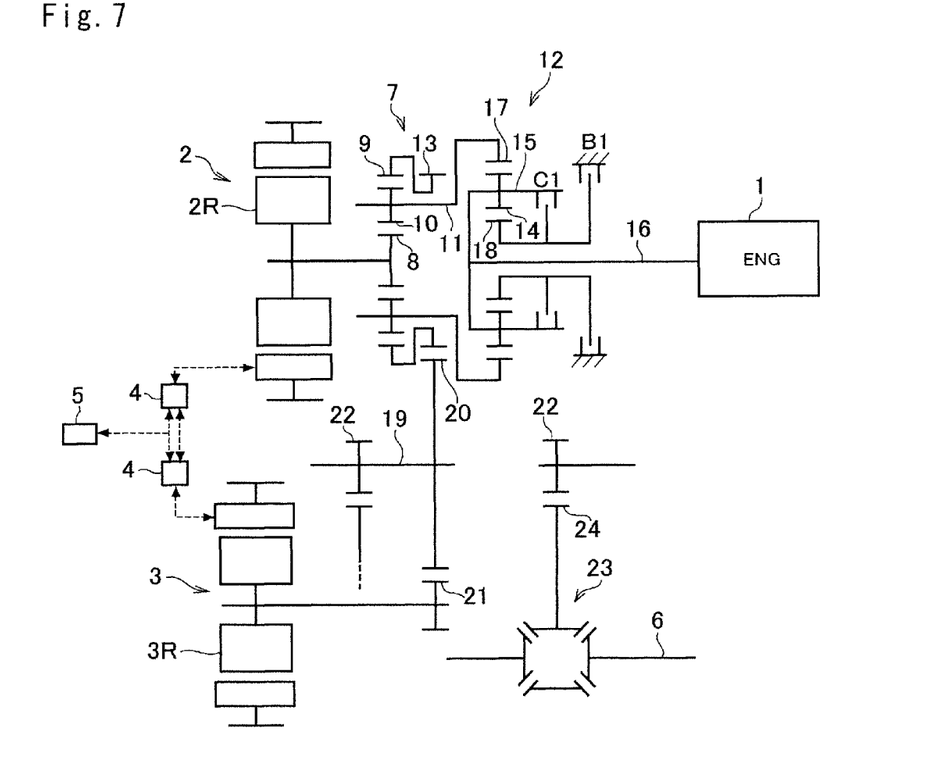
FIG. 7 is a diagram schematically showing an example of a hybrid drive unit to which the control system of the present invention is applied.

Referring now to FIG. 7, there is shown a preferred example of the hybrid drive unit to which the control system of the present invention is applied. A prime mover of the hybrid drive unit shown in FIG. 7 is comprised of an engine 1 and a first motor-generator 2 (MG1) and a second motor-generator 3 (MG2). For example, a conventional three-phase synchronous motor may be used individually as the motor-generators 2 and 3. An output torque as well as a rotational speed of the motor-generators 2 and 3 may be controlled individually. Specifically, in case the rotational speed of the motor-generator 2 (or 3) is increased, an electric power is consumed. By contrast, in case rotational speed of the motor-generator 2 (or 3) is lowered to output a torque, an electric power is generated by the motor-generator 2 (or 3). To this end, those motor generators 2 and 3 are electrically connected with a battery 5 through a controller 4 such as an inverter. In addition, as indicated by broken lines in FIG. 7, the electric power generated by the motor-generator 2 (or 3) can be exchanged directly between those the motor-generators 2 and 3 without passing through the battery 5. Here, the battery 5 corresponds to the electric storage device of the present invention.

In the example shown in FIG. 7, a power of the engine 1 is distributed to the first motor-generator 2 side and a drive shaft 6 side, and the second motor-generator 3 is operated by the electric power generated by the first motor-generator 2 so that the drive shaft 6 is rotated by the power of the second motor-generator 3. That is, so-called a "two-motor type" hybrid drive unit is shown in FIG. 7. In order to distribute the power of engine 1 to the first motor-generator 2 side and a drive shaft 6 side, the hybrid drive unit is provided with a power distribution device 7.

In this example, a planetary gear unit is disposed coaxially with the engine 1 to serve as a power distribution device 7. Specifically, the power distribution device 7 is adapted to perform a differential action among three rotary elements, and a sun gear 8 is connected with a rotor 2R of the first motor-generator 2 disposed in the opposite side of the engine 1 across the power distribution device 7. A ring gear 9 is arranged concentrically with the sun gear 8, and a pinion gear(s) 10 interposed between the sun gear 8 and the ring gear 9 while meshing therewith is/are supported by a carrier 11 while being allowed to rotate and revolve around the sun gear 8. The carrier 11 is connected with an output element of a transmission 12 arranged between the engine 1 and the power distribution device 7, and the ring gear 9 is connected with a drive gear 13 disposed between the transmission 12 and the power distribution device 7.

The transmission 12 is comprised of a single pinion planetary gear unit serving as a differential, and adapted to shift a gear stage between a direct drive stage and a speed increasing stage (i.e., an overdrive stage (O/D)). In the transmission 12, a carrier 15 supporting a pinion gear(s) 14 in a rotatable and revolvable manner is connected with an output shaft 16 of the engine 1, and a ring gear 17 is connected with the carrier 11 of the power distribution device 7 in a manner to be rotated integrally therewith. In this example, a clutch C1 is disposed between a sun gear 18 and the carrier 15 to connect those elements selectively, and a brake B1 is disposed to selectively halt the sun gear 18 arranged concentrically with the ring gear 17. For example, a hydraulically engaged frictional engagement device may be employed individually as the clutch C1 and brake B1.

A counter shaft 19 is arranged in parallel with a common rotational center axis of the power distribution device 7 and the first motor-generator 2, and a counter driven gear 20 meshing with the drive gear 13 is fitted onto the counter shaft 19 to be rotated integrally therewith. A diameter of the counter driven gear 20 is larger than that of the drive gear 13 so that a rotational speed is reduced, that is, torque is amplified during transmitting the torque from the power distribution device 7 to the counter shaft 19.

The second motor-generator 3 is arranged in parallel with the counter shaft 19 so that torque thereof may be added to the torque transmitted from the power distribution device 7 to the drive shaft 6. To this end, a reduction gear 21 connected with a rotor 3R of the second motor-generator 3 is meshed with the counter driven gear 20. A diameter of the reduction gear 21 is smaller than that of the counter driven gear 20 so that the torque of the second motor-generator 3 is transmitted to the counter driven gear 20 or the counter shaft 16 while being amplified.

In addition, a counter drive gear 22 is fitted onto the counter shaft 19 in a manner to be rotated integrally therewith, and the counter drive gear 22 is meshed with a ring gear 24 of a differential gear unit 23 serving as a final reduction device. In FIG. 7, however, a position of the differential gear unit 23 is displaced to the right side for the convenience of illustration.

In the hybrid drive unit thus structured, a drive mode can be selected from an engine mode where the vehicle is powered by the engine 1, a single motor mode where the vehicle is powered by one of the motor generators 2 and 3 (mainly by the second motor-generator 3), and a dual motor mode where the vehicle is powered by both of the motor-generators 2 and 3. Those drive modes are realized by controlling the clutch C1, the brake B1 and output torques of the motor-generators 2 and 3.

Figure 8:
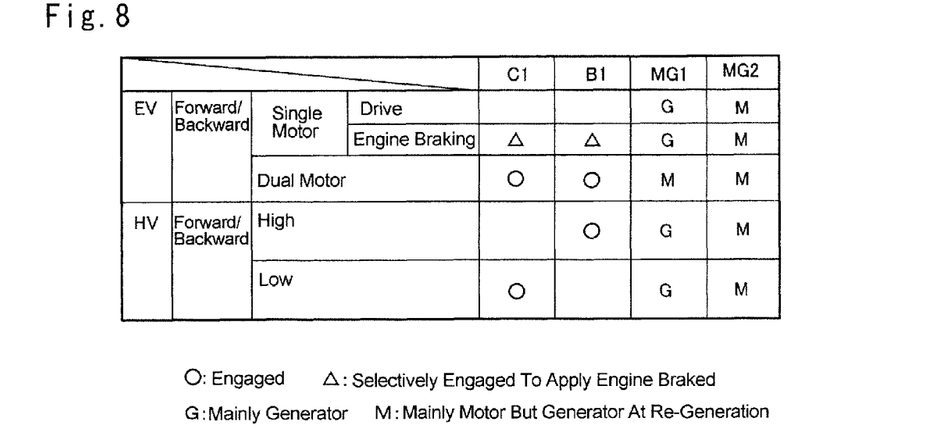
FIG. 8 is a table showing operating statuses of the clutch, the brake, and the motor-generators under each drive mode.

Statuses of the clutch C1, the brake B1 and the motor generators 2 and 3 under each driving mode are shown in FIG. 8. In FIG. 8, "EV" represents the drive modes for propelling the vehicle while stopping the engine 1. As can be seen from FIG. 8, in case of propelling or braking the vehicle under the single-motor mode, both of the clutch C1 and the brake B1 are disengaged to bring the transmission 12 into a neutral state while interrupting a torque transmission between the engine 1 and the power distribution device 7. In this situation, the drive force is applied to the driving wheels by operating the second motor-generator 3 as a motor, and a braking force is generated by operating the first motor-generator 2 as a generator. In FIG. 8, "G" represents a situation where the motor generator 2 or 3 is operated as a generator, and "M" represents a situation where the motor generator 2 or 3 is operated as a motor. Thus, the single motor mode is established by disengaging both of the clutch C1 and the brake B1 while operating the second motor-generator 3 as a motor.

Under the single motor mode, therefore, the rotational speed of the engine 1 is reduced to zero by an inertial force of the engine itself, a fiction torque and so on, and the sun gear 18 is idled. A power loss resulting from idling the first motor-generator 2 under the single motor mode may be reduced by stopping the first motor-generator 2. For example, the first motor-generator 2 can be stopped by carrying out a so-called "d shaft locking control" for energizing the first motor-generator 2 to stop. However, if the first motor-generator 2 can be stopped by an inertial force thereof or a friction torque, it is not necessary to energize the first motor-generator 2.

As descried, both of the motor-generators 2 and 3 are used to propel the vehicle under the dual motor mode. Therefore, the dual motor mode is selected when a required torque is comparatively large, and both of the motor-generators 2 and 3 are operated as motors. In this case, a rotation of the carrier 11 of the power distribution device 7 is stopped to deliver the drive force generated by the first motor-generator 2. Specifically, in order to stop a rotation of the transmission 12 connected with the carrier 11, the clutch C1 and the brake B1 are engaged. Consequently, a torque of the first motor-generator 2 is delivered to the ring gear 9 while being reversed, and outputted from the ring gear 9 while being amplified in accordance with a gear ratio of the power distribution device 7.

In the hybrid drive unit shown in FIG. 7, the engine mode is established by engaging the clutch C1 or the brake B1 depending on a required drive force. Under the engine mode, therefore, the engine 1 is connected with the power distribution device 7 so that the power generated by the engine 1 is delivered to the driving wheels. In this case, a reaction force of the first motor-generator 2 is applied to the power distribution device 7 during delivering the power of the engine 1 to the driving wheels. In this situation, the first motor-generator 2 generates an electric power in accordance with the power transmitted thereto, if a direction to rotate the first motor-generator 2 by the power transmitted thereto is opposite to the direction of the torque being generated by the first motor-generator 2. That is, the power of the engine 1 delivered to the power distribution device 7 is partially converted into an electric power. The electric power thus regenerated by the first motor-generator 2 or the electric power stored in the battery 5 is supplied to the second motor-generator 3 to generate a torque, and the torque of the second motor-generator 3 is delivered to the counter driven gear 20. Thus, under the engine mode, the power of the engine 1 is delivered to the driving wheels by operating the first motor-generator 2 as a generator thereby allowing the sun gear 8 of the power distribution device 7 as a reaction element, while assisting the drive torque by the second motor-generator 3. Accordingly, the engine mode also may be called a hybrid mode. Here, in FIG. 8, "HV" represents the engine mode.

A rotational speed of the first motor-generator 2 can be controlled arbitrarily in accordance with a value and a frequency of a current applied thereto so that a rotational speed of the engine 1 can be controlled by controlling the rotational speed of the first motor-generator 2. To this end, specifically, a target power of the engine 1 is determined based on an opening degree of an accelerator, a vehicle speed and so on, and an operating point of the engine 1 is determined based on the target power of the engine 1 and an optimum fuel economy curve. Then, the rotational speed of the first motor-generator 2 is controlled in a manner such that the engine 1 is operated at the operating point thus determined. In this situation, since the rotational speed of the first motor-generator 2 can be changed continuously, the rotational speed of the engine 1 can also be changed continuously. Accordingly, the power distribution device 7 is allowed to serve as a continuously variable transmission that is controlled electrically.

Provided that the engine speed is controlled as explained above under a condition that the vehicle speed is high, the first motor-generator 2 may be operated as a motor unwillingly. Therefore, in order to prevent the first motor-generator 2 from being operated as a motor, a gear stage of the transmission 12 is shifted to the speed increasing stage (Hi) when the vehicle speed is increased. That is, if the vehicle speed is low or middle, the direct drive stage (Lo) is established in the transmission 12 by engaging the clutch C1. In contrast, if the vehicle speed is high, the speed increasing stage is established in the transmission 12 by engaging the brake B1.

Figure 9:
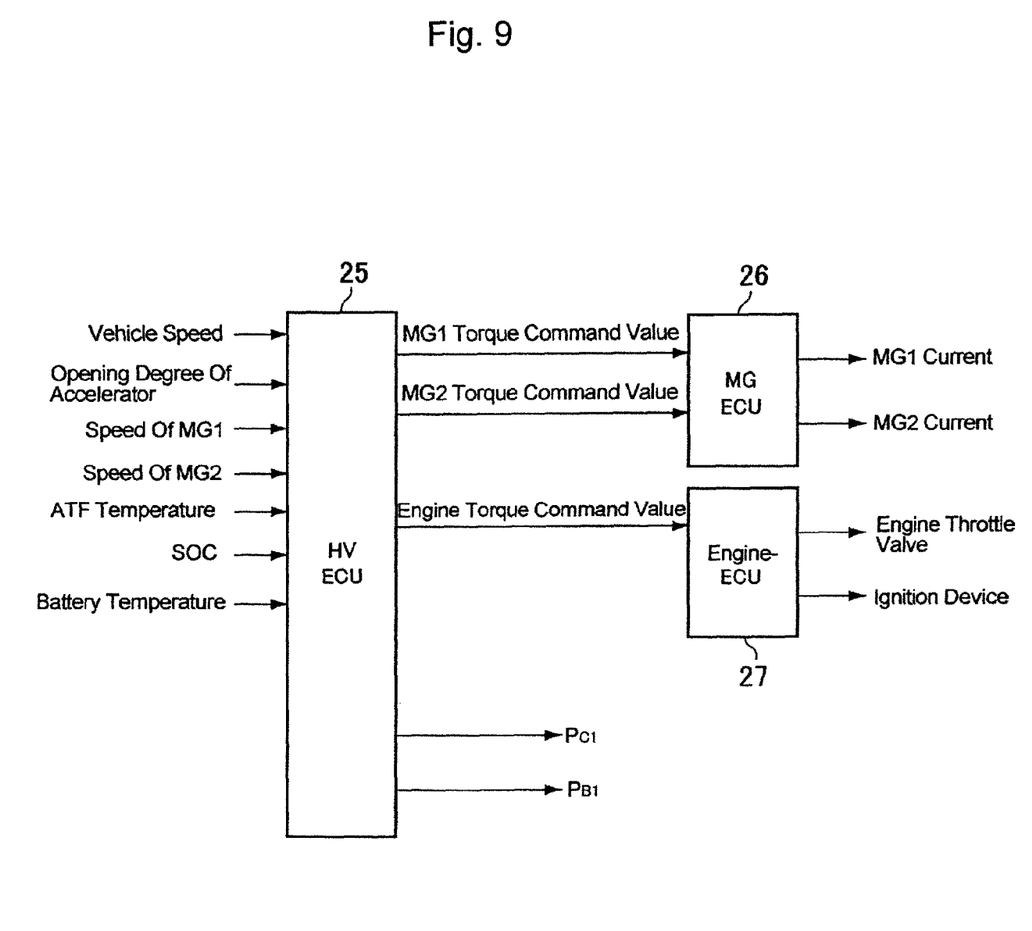
FIG. 9 is a block diagram showing an example of a configuration of electronic control unit for controlling the engine, the motor-generators, the clutch and the brake.

Next, here will be explained an electronic control system for controlling the clutch C1, the brake B1, the motor-generators 2 and 3 and the engine 1 with reference to the block diagram shown in FIG. 9. The control system is comprised of a hybrid control unit (as will be called HV-ECU hereinafter) 25 for entirely controlling a running condition of the vehicle, a motor-generator control unit (as will be called MG-ECU hereinafter) 26 for controlling the motor-generators 2 and 3, and an engine control unit (as will be called engine-ECU hereinafter) 27 for controlling the engine 1. Each control unit 25, 26 and 27 are individually composed mainly of a microcomputer configured to carry out a calculation based on input data and preinstalled data, and to output a calculation result in the form of a command signal. For example, a vehicle speed, an opening degree of the accelerator, a speed of the first motor-generator 2, a speed of the second motor-generator 3, a temperature of oil supplied to the power distribution device 7, the transition 12 and etc. (i.e., ATF temperature), a state of charge (as will be abbreviated SOC hereinafter) of the battery 5, a temperature of the battery 5 and so on are inputted to the HV-ECU 25. Meanwhile, the HV-ECU 25 is configured to output a torque command for the first motor-generator 2, a torque command for the second motor-generator 3, a torque command for the engine 1, a hydraulic pressure value for controlling the clutch C1 ($P_{c1}$), a hydraulic pressure value for controlling the brake B1 ($P_{b1}$) and so on.

The torque command for the first motor-generator 2 and the torque command for the second motor-generator 3 are sent to the MG-ECU 26, and the MG-ECU 26 calculates current commands to be sent individually to the first motor-generator 2 and the second motor-generator 3 using those input data. Meanwhile, the torque command for the engine 1 is sent to the engine-ECU 27, and the E/G-ECU 27 calculates a command to control an opening degree of the electronic throttle valve and a command to control an ignition timing using those input data, and the calculated command values are individually sent to the throttle valve and ignition device (not shown). The hydraulic pressure value for controlling the clutch C1 ($P_{c1}$) and the hydraulic pressure value for controlling the brake B1 ($P_{b1}$) are sent to not shown control valves and so on.

In the hybrid drive unit thus structured, the drive mode is shifted from the EV mode to the HV mode depending on a condition, for example, when a required drive force is increased or when the SOC of the battery 5 is insufficient. When the drive mode is shifted from the EV mode to the HV mode, a cranking of the engine 1 is to be carried out by the first motor-generator 2 in most cases. To this end, specifically, any of the clutch C1 and the brake B1 is engaged to connect the engine 1 with the power distribution device 7 to allow a torque to be transmitted therebetween. Then, the first motor-generator 2 generates a torque required to carry out the cranking of the engine 1 thereby increasing a rotational speed of the engine 1 to a predetermined speed (as will be called a "starting speed" hereinafter). In this situation, in the power distribution device 7, the sun gear 8 serves as an input element, and the carrier 11 serves as an output element. Therefore, the torque of the second motor-generator 3 is controlled in manner such that the ring gear 9 of the power distribution device 7 is allowed to serve as a reaction element. In this situation, if the second motor-generator 3 is required to output a drive force, the second motor-generator 3 outputs the torque for allowing the ring gear 9 to serve as the reaction element and a torque to achieve a required drive force in total.

When starting the engine 1, rotational speeds of the engine 1 and the rotary elements of the power distribution device 7 and the transmission 12 are changed. Therefore, the first and the second motor-generators 2 and 3 output powers in an amount of change in the rotational speeds of those members, in other words, in an amount of change in an inertial energy. However, the rotational speeds of the first motor-generator 2 and the rotary elements of the power distribution device 7 and the transmission 12 differ depending on a speed ratio of the transmission 12. That is, when starting the engine 1 while keeping the vehicle running or stopping, required powers to be generated by the motor-generators 2 and 3 differ depending on the speed ratio of the transmission 12. In other words, an amount of the electric power consumed by the motor-generators 2 and 3 differ depending on the speed ratio of the transmission 12. Nonetheless, the first motor-generator 2 may also generate an electric power when generating a torque to start the engine 1 depending on an operating condition. In this case, a generating amount of the first motor-generator 2 also differs depending on the speed ratio of the transmission 12.

Figure 2A:
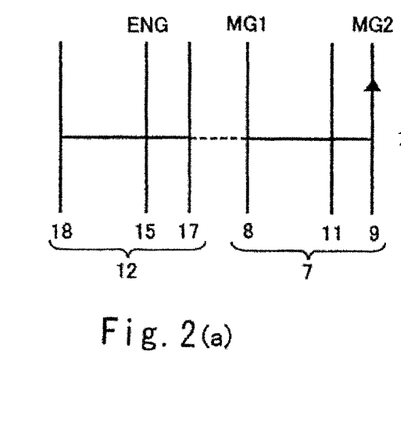
Figure 2B:
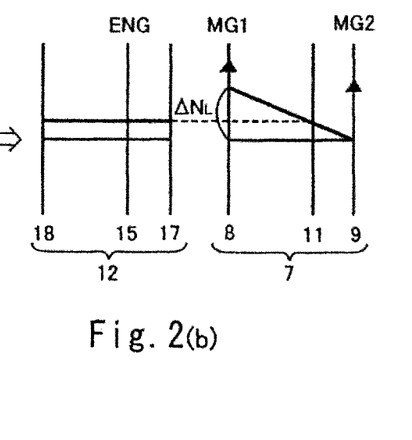
Figure 2C:
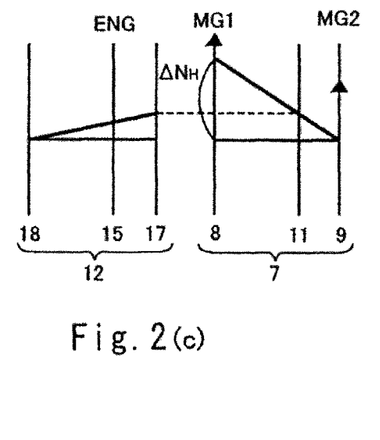
Figure 3A:
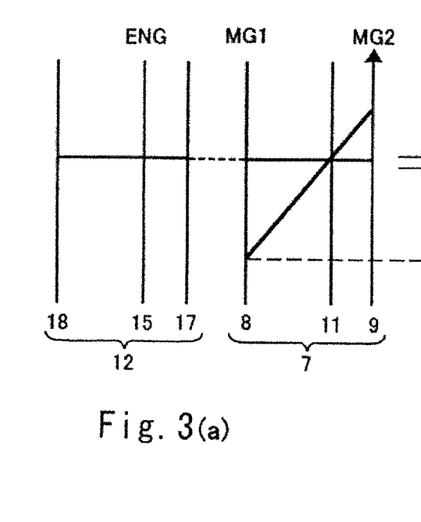
Figure 3B:
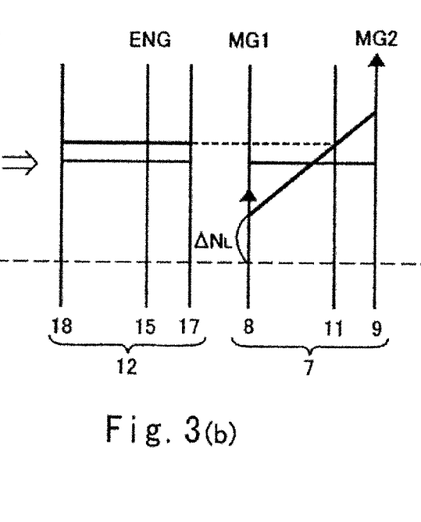
Figure 3C:
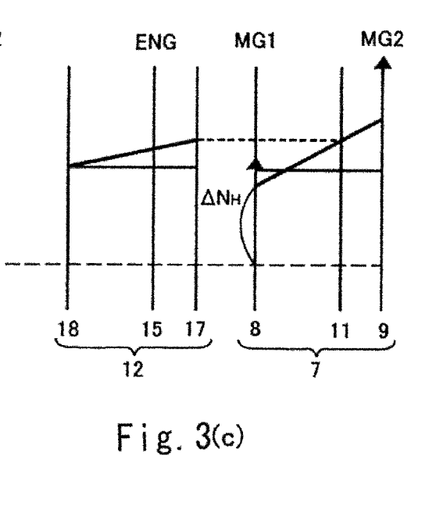

Referring now to FIGS. 2 and 3, there are shown changes in rotational speeds of the rotary elements resulting from starting the engine 1. FIG. 2 is a nomographic diagram showing changes in rotational speeds of the rotary elements under a situation that the engine 1 is started in the stopping vehicle and an accelerator pedal is depressed to generate a drive force. In FIG. 2, specifically, FIG. 2 (a) shows statuses of the rotary members before starting the engine, FIG. 2 (b) shows statuses of the rotary members of a case in which a speed of the engine 1 is raised to the starting speed under the direct drive stage in the transmission 12, and FIG. 2 (c) shows statuses of the rotary members of a case in which a speed of the engine 1 is raised to the starting speed under the speed increasing stage in the transmission 12. As shown in FIG. 2 (a), rotational speeds of all of the rotary elements are zero under the condition that the engine 1 is stopped in the stopping vehicle. In this situation, the second motor-generator 3 generates a required drive force.

In case of starting the engine 1 under the direct drive stage of the transmission 12 as shown in FIG. 2 (b), the first motor-generator 2 is rotated in a forward direction to generate a positive torque thereby increasing a rotational speed of the engine 1. That is, the first motor-generator 2 is operated as a motor. Meanwhile, an output torque of the second motor-generator 3 is controlled to act as a reaction torque against the output torque of the first motor-generator 2. Specifically, the second motor-generator 3 is controlled to generate a torque for achieving the required drive force and the reaction torque in total. When the engine speed is raised to the starting speed, the rotary elements 15, 17 and 18 of the transmission 12, and the carrier 11 of the power distribution device 7 are rotated at the same speed as the engine speed. In this situation, the first motor-generator 2 is rotated at a speed achieved in accordance with the rotational speed of the carrier 11 and a gear ratio of the power distribution device 7.

In case of starting the engine 1 under the speed increasing stage of the transmission 12 as shown in FIG. 2 (c), the first motor-generator 2 is also operated as a motor, and the second motor-generator 3 also generates the torque for achieving the required drive force and the reaction torque in total. In this case, when the engine speed is raised to the starting speed, the ring gear 17 of the transmission 12 and the carrier 11 of the power distribution device 7 are rotated at a speed higher than the rotational speed of the engine 1. Thus, in case of starting the engine 1 under the speed increasing stage of the transmission 12, the carrier 11 is rotated at the higher speed than that of the case of starting the engine 1 under the direct drive stage. Consequently, the first motor-generator 2 is rotated at the higher speed than that of the case in which the engine 1 is started under the direct drive stage.

Thus, under those gear stages of the transmission 12, the rotary elements and the first motor-generator 2 are rotated at different speeds, that is, an amount of changes in the inertial energies of the rotary elements and the first motor-generator 2 differ depending on the gear stages of the transmission 12. Therefore, in order to start the engine 1 while maintaining an operational status of the vehicle, the motor-generators 2 and 3 are required to generate different powers to start the engine 1 depending on the gear stage of the transmission 12, and in accordance with the amount of changes in inertial energies of the rotary elements. Specifically, the output powers of the motor-generators 2 and 3 are increased with an increase in an integration value of the amount of changes in the inertial energies. Consequently, an amount of the electric powers to be consumed or generated by the motor-generators 2 and 3 are increased. In addition, an inertia force (i.e., a mass) of the first motor-generator 2 is larger than those of the gears of the transmission 12 and the power distribution device 7. Therefore, the electric power consumption is increased with an increase in the change in the rotational speed of the first motor-generator 2. As can be seen from FIG. 2, specifically, the amount of change $\Delta N_H$ in a rotational speed of the first motor-generator 2 resulting from starting the engine 1 under the speed increasing stage is larger than the amount of change $\Delta N_L$ in a rotational speed of the first motor-generator 2 resulting from starting the engine 1 under the direct drive stage. This means that the larger amount of the electric power is to be consumed to start the engine 1 under the speed increasing stage than that under the direct drive stage.

FIG. 3 is a nomographic diagram showing changes in the rotational speeds of the rotary members under a condition that a predetermined drive force is required in the running vehicle and the engine 1 is therefore started. In FIG. 3, specifically, FIG. 3 (a) shows statuses of the rotary members before starting the engine 1, FIG. 3 (b) shows statuses of the rotary members of a case in which the rotational speed of the engine 1 is raised to the starting speed under the direct drive stage in the transmission 12, and FIG. 3 (c) shows statuses of the rotary members of a case in which the rotational speed of the engine 1 is raised to the starting speed under the speed increasing stage in the transmission 12.

In the example shown in FIG. 3, the vehicle is propelled under the single motor mode. In order to start the engine 1 under the single motor mode, the clutch C1 or the brake B1 is engaged to connect the engine 1 with the power distribution device 7 thereby allowing a torque transmission therebetween. To this end, as shown in FIG. 3 (a), the clutch C1 or the brake B1 is engaged while synchronizing an input speed and an output speed thereof by reducing the rotational speed of the carrier 11 to zero. In the situation shown in FIG. 3 (a), the second motor-generator 3 generates a torque to achieve the required drive force.

When the engine 1 is started under the direct drive stage of the transmission 12 as shown in FIG. 3 (b), the first motor-generator 2 is controlled in a manner to generate a positive torque to increase the engine speed while being rotated in a counter direction. That is, the first motor-generator 2 is operated as a generator. Meanwhile, the second motor-generator 3 is controlled to generate a torque for achieving the required drive force and a reaction torque against the output torque of the first motor-generator 2 in total. When the rotational speed of the engine 1 is raised to the starting speed, the rotary elements 15, 17 and 18 of the transmission 12, and the carrier 11 of the power distribution device 7 are rotated at the same speed as the engine speed. In this situation, the first motor-generator 2 is rotated at a speed achieved in accordance with the rotational speed of the carrier 11 and a gear ratio of the power distribution device 7.

As shown in FIG. 3 (c), in case of starting the engine 1 under the speed increasing stage of the transmission 12, the first motor-generator 2 is also operated as a motor, and the second motor-generator 3 also generates the torque for achieving the required drive force and the reaction torque in total. In this case, when the engine speed is raised to the starting speed, the ring gear 17 of the transmission 12 and the carrier 11 of the power distribution device 7 are rotated at a speed higher than the rotational speed of the engine 1. Thus, in case of starting the engine 1 under the speed increasing stage of the transmission 12, the carrier 11 is rotated at the higher speed than that of the case in which the engine 1 is started under the direct drive stage. Consequently, the first motor-generator 2 is rotated at a speed achieved in accordance with the vehicle speed and the speed of the carrier 11. That is, an amount of change in the rotational speed of the first motor-generator 2 is increased with an increase in an amount of change in the rotational speed of the carrier 11. According to the example shown in FIG. 3, therefore, the first motor-generator 2 is rotated at a speed closer to zero in case of starting the engine 1 under the speed increasing stage, in comparison with that of the case of starting the engine 1 under the direct drive mode.

Thus, according to the example shown in FIG. 3, the amount of change $\Delta N_H$ in a rotational speed of the first motor-generator 2 resulting from starting the engine 1 under the speed increasing stage is larger than the amount of change $\Delta N_L$ in a rotational speed of the first motor-generator 2 resulting from starting the engine 1 under the direct drive stage. In addition, in the example shown in FIG. 3, the engine 1 is started by operating the first motor-generator 2 as a generator. Therefore, a larger electric power is generated in case of starting the engine 1 under the speed increasing stage, in comparison with the case of starting the engine 1 under the direct drive stage.

Figure 1:
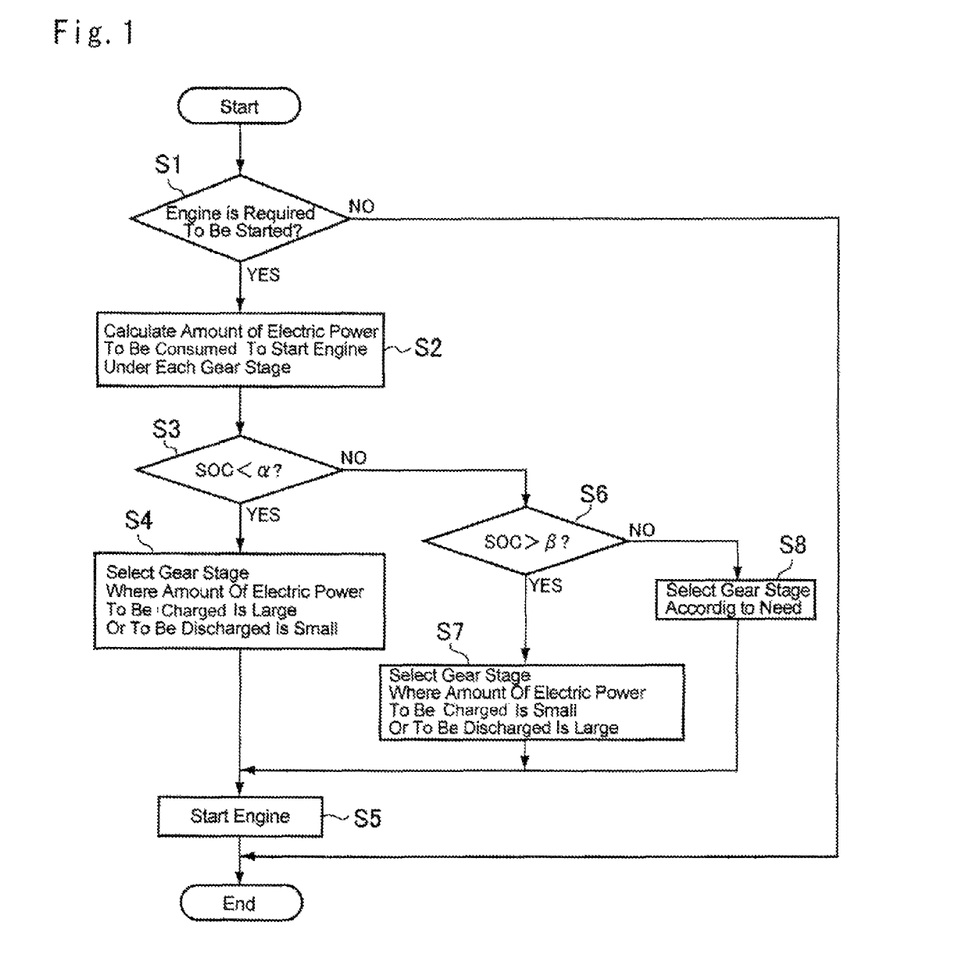
FIG. 1 is a flowchart showing a control example of the present invention for selecting a gear stage to start the engine.

As described, an amount of change in the rotational speed of the first motor-generator 2 differs depending on the speed ratio of the transmission 12 when starting the engine 1. That is, the electric power required to start the engine 1 differ depending on the speed ratio of the transmission 12. Therefore, an overcharging or an over discharging of the battery 5 may be caused when starting the engine 1 depending on the speed ratio. Otherwise, a voltage or a current higher than an allowable level may be applied to electronic equipment such as the battery 5 and the controller 4. In order to avoid such disadvantages, the control system of the present invention changes a speed ratio of the transmission 12 when starting the engine 1 in accordance with an SOC of the battery 5. A preferred example of such control is shown in FIG. 1. Here, the routine shown in FIG. 1 is repeated at predetermined intervals. According to the example shown in FIG. 1, first of all, it is determined whether or not the engine 1 is required to be started (at step S1). For example, the control system determines a fact that that the engine 1 is required to be started given that the required drive force is increased under the EV mode where the engine 1 is stopped so that a condition to shift the drive mode to the HV mode is satisfied. Otherwise, the control system also determines that the engine 1 is required to be started given that the SOC of the battery is lower than a predetermined criterion value.

If the engine 1 is not required to be started so that the answer of step S1 is NO, the routine is ended. In contrast, if engine 1 is required to be started so that the answer of step S1 is YES, an amount of the electric power to be consumed or generated to start the engine 1 under each gear stage of the transmission 12 is individually calculated (at step S2). Specifically, the amount of the electric consumption or the electric power generation is calculated based on the torques and the rotational speeds of the motor-generators 2 and 3, and an amount of changes in the inertial energies of the engine 1, the first motor-generator 2 and the rotary members. That is, a predicted integration value of the electric power to be consumed or generated by starting the engine 1 is calculated at step S2. To this end, when the first motor-generator 2 serving as a generator starts serving as a motor to start the engine 1, a difference between the amount of the electric power to be generated by the first motor-generator 2 and the amount of the electric power to be consumed by the first motor-generator 2 is calculated. For example, given that the engine 1 is started at a comparatively low vehicle speed, the first motor-generator 2 is operated as a generator as shown in FIG. 3. Then, the rotational direction of the first motor-generator 2 is reversed eventually and the first motor-generator 2 starts serving as a motor. Therefore, a difference between the amount of the electric power to be generated by the first motor-generator 2 and the amount of the electric power to be consumed by the first motor-generator 2 is calculated at step S2. For this purpose, alternatively, the electric power to be consumed or generated during increasing the rotational speed of the engine 1 to the starting speed may be determined in advance with respect to the gear stage and the vehicle speed, and preinstalled in the HV-ECU 25 in the form of a map.

Then, it is determined whether or not the SOC of the battery 5 is lower than a predetermined lower limit threshold value $\alpha$ (at step S3). Such judgment of step S3 is carried out to avoid deterioration in durability of the battery 5 resulting from an over discharging caused by starting the engine 1. To this end, the lower limit threshold value $\alpha$ is set to a larger value than the lowest limit value of the SOC of the battery 5 based on a capacity of the battery 5. Alternatively, it is also possible to determine the SOC of the battery 5 on the basis of a charging amount or a charging rate of the battery 5, or a voltage therein. Accordingly, the lower limit threshold value $\alpha$ corresponds to the first threshold value of the present invention. If the SOC of the battery 5 is lower than the lower limit threshold value $\alpha$ so that the answer of step S3 is YES, the gear stage where the amount of electric consumption calculated at step S2 is smaller or where the amount of electric generation calculated at step S2 is larger is selected (at step S4). In other words, the gear stage where a discharging amount of the battery 5 is smaller or where a charging amount of the battery 5 is larger is selected. Specifically, the direct drive stage is selected under the situation shown in FIG. 2, and the speed increasing stage is selected under the situation shown in FIG. 3. Then, the engine 1 is started under the gear stage selected at step S4 (at step S5), and the routine is ended.

In contrast, if the SOC of the battery 5 is higher than the lower limit threshold value $\alpha$ so that the answer of step S3 is NO, it is determined whether or not the SOC of the battery 5 is higher than a predetermined upper limit threshold value $\beta$ of the battery 5 (at step S6). Such judgment of step S6 is carried out to avoid deterioration in durability of the battery 5 resulting from an overcharging caused by starting the engine 1. To this end, the upper limit threshold value $\beta$ is set to a value between the lower limit threshold value $\alpha$ and the highest limit value of the SOC of the battery 5 based on a capacity of the battery 5. Accordingly, the upper limit threshold value $\beta$ corresponds to the second threshold value of the present invention. If the SOC of the battery 5 is higher than the upper limit threshold value $\beta$ so that the answer of step S6 is YES, the gear stage where the amount of electric consumption calculated at step S2 is larger or where the amount of electric generation calculated at step S2 is smaller is selected (at step S7). In other words, the gear stage where a discharging amount of the battery 5 is larger or where a charging amount of the battery 5 is smaller is selected. Specifically, the speed increasing stage is selected under the situation shown in FIG. 2, and the direct drive stage is selected under the situation shown in FIG. 3. Then, the engine 1 is started under the gear stage selected at step S7 (at step S5), and the routine is ended.

If the SOC of the battery 5 is higher than the lower limit threshold value $\alpha$ but lower than the upper limit threshold value $\beta$ so that the answer of step S6 is NO, the battery 5 will not be charged overly and the electric power stored in the battery 5 will not be consumed overly. That is, it is not necessary to shift the gear stage depending on the SOC of the battery 5. In this case, therefore, the gear stage may be selected in accordance with a required drive force, a change in the required drive force and so on (at step S8). Then, the engine 1 is started under the gear stage selected at step S8 (at step S5), and the routine is ended.

Thus, if the SOC of the battery 5 is expected to be out of the allowable range between the lower limit threshold value $\alpha$ and the upper limit threshold value $\beta$ after starting the engine 1, the control example shown in FIG. 1 starts the engine 1 while selecting the gear stage out of two gear stages in a manner such that the SOC of the battery 5 is maintained within the allowable range, or that the SOC of the battery 5 is kept close to the threshold values. The control shown in FIG. 1 may also be applied to the hybrid drive unit shown in FIG. 7 in which the gear stage is selected from more than three stages or a speed ratio is changed continuously. In this case, the control system also selects the gear stage when starting the engine 1 in a manner to maintain the SOC of the battery 5 within the allowable range.

As described, the amount of the electric power to be consumed or to be generated when starting the engine 1 can be controlled by selecting the gear stage of the transmission 12 in accordance with the SOC of the battery 5. Therefore, an overcharging and an over discharging of the battery 5 will not be caused so that the battery 5 can be prevented from being damaged. In addition, a control amount and a control frequency of the electric power can be reduced so that the controller 4 and auxiliaries can be prevented from being damaged.

Figure 4A:
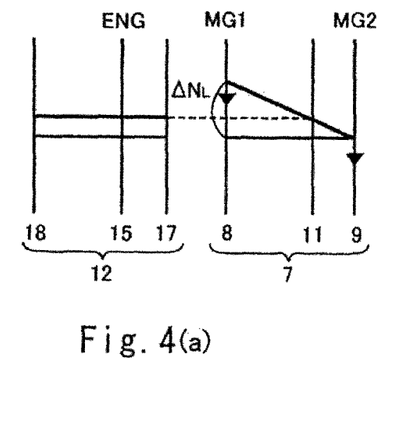
Figure 4B:
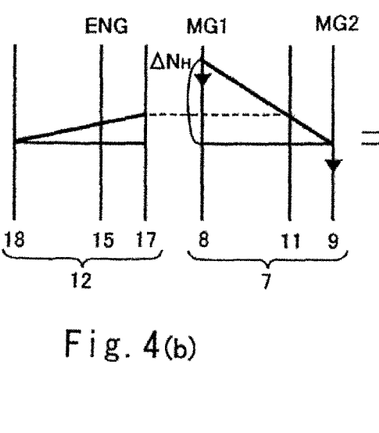
Figure 4C:
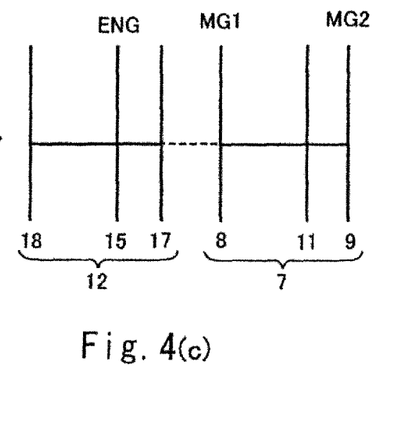
Figure 5:
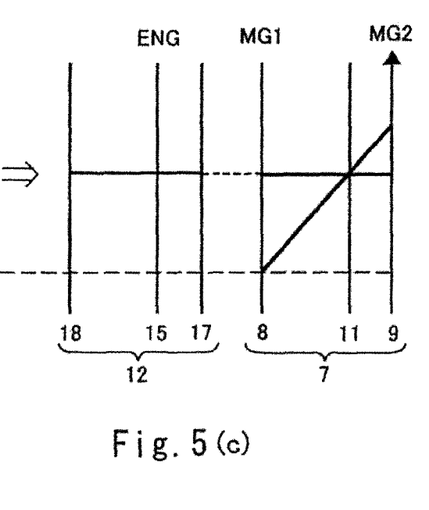

In order to stop the engine 1 promptly in the hybrid drive unit shown in FIG. 7, it is preferable to stop the engine 1 while delivering a torque of the first motor-generator 2 to the engine 1. In this case, an amount of changes in the rotary members are also changed in accordance with the speed ratio of the transmission 12 as the case of starting the engine 1. Therefore, an amount of the electric power to be consumed or to be generated when stopping the engine 1 is also changed. Referring now to FIGS. 4 and 5, there are shown changes in rotational speeds of the rotary elements resulting from stopping the engine 1. FIG. 4 is a nomographic diagram showing changes in rotational speeds of the rotary elements under a situation that the engine 1 is stopped in the stopping vehicle. In FIG. 4, specifically, FIG. 4 (a) shows statuses of the rotary members under the condition that the engine 1 is stopped under the direct drive stage, FIG. 4 (b) shows statuses of the rotary members under a condition that the engine 1 is stopped under the speed increasing stage, and FIG. 4 (c) shows statuses of the rotary members after stopping the engine 1. Here, FIGS. 4 (a) and 4 (b), the engine speed represents an idling speed.

As can be seen from FIGS. 4 (a) and 4 (b), when the engine 1 is stopped in the stopping vehicle, the first motor-generator 2 is rotated in the forward direction while generating a negative torque. That is, the engine 1 is operated as a generator in this situation. Meanwhile, an output torque of the second motor-generator 3 is controlled to act as a reaction torque, that is, the second motor-generator 3 generates a torque downwardly in FIG. 4 (i.e., a negative torque). As shown in FIG. 4 (a), given that the engine 1 is stopped under the direct drive stage of the transmission 12, the rotary elements 15, 17 and 18 of the transmission 12, and the carrier 11 of the power distribution device 7 are rotated at the idling speed of the engine 1. In this situation, the rotational speed of the ring gear 9 of the power distribution device 7 is reduced to zero. Therefore, the first motor-generator 2 is rotated at a speed achieved in accordance with the rotational speed of the carrier 11 and a gear ratio of the power distribution device 7 that is higher than the idling speed of the engine 1.

When the engine 1 is stopped under the condition that the rotary members are rotated as indicated in FIG. 4 (*a*), the rotary members are stopped as indicated in FIG. 4 (*c*). Therefore, in case of stopping the engine 1 in the stopping vehicle under the direct drive stage, the energy is regenerated by the first motor-generator 2 in the amount of changes in the inertial energies resulting from changes in the rotary members, and the energy thus regenerated is stored in the battery 5.

Given that the engine 1 is stopped in the stopping vehicle under the speed increasing stage of the transmission 12 as indicated in FIG. 4 (*b*), the energy is also regenerated by the first motor-generator 2 in the amount of changes in the inertial energies resulting from changes in the rotary members, and the energy thus regenerated is also stored in the battery 5. Meanwhile, in case the engine 1 is stopped in the stopping vehicle under the speed increasing stage of the transmission 12, the first motor-generator 2 whose inertial force (i.e., a mass) is comparatively large is rotated at higher speed than that under the direct driving stage. That is, the amount of change in the rotational speed of the first motor-generator 2 when stopping the engine 1 under the speed increasing stage is larger than that under the direct drive stage. Therefore, larger amount of the electric power is generated as a result of stopping the engine 1 under the speed increasing stage in comparison with that under the direct drive stage.

FIG. 5 is a nomographic diagram showing changes in the rotational speeds of the rotary members under a situation that the engine 1 is stopped in the running vehicle. In FIG. 5, specifically, FIG. 5 (*a*) shows statuses of the rotary members under the condition that the engine 1 is stopped under the direct drive stage, FIG. 5 (*b*) shows statuses of the rotary members under a condition that the engine 1 is stopped under the speed increasing stage, and FIG. 5 (*c*) shows statuses of the rotary members after stopping the engine 1. Here, in FIGS. 5 (*a*) and 5 (*b*), the engine speed represents the idling speed. According to the example shown in FIG. 5, specifically, the engine 1 is stopped in the vehicle running under the single motor mode. In this situation, therefore, the second motor generator 3 generates a reaction torque in addition to a torque for achieving the required drive force.

As can be seen from FIGS. 5 (*a*) and 5 (*b*), when the engine 1 is stopped in the running vehicle, the first motor-generator 2 is rotated in the counter direction while generating a negative torque. That is, the engine 1 is operated as a motor in this situation. Meanwhile, an output torque of the second motor-generator 3 is controlled to act as a reaction torque, that is, the second motor-generator 3 generates a torque downwardly in FIG. 5 (i.e., a negative torque). As shown in FIG. 5 (*a*), given that the engine 1 is stopped under the direct drive stage of the transmission 12, the rotary elements 15, 17 and 18 of the transmission 12, and the carrier 11 of the power distribution device 7 are rotated at the idling speed of the engine 1. In this situation, the ring gear 9 of the power distribution device 7 is rotated at a speed achieved in accordance with the vehicle speed. Therefore, the first motor-generator 2 is rotated at a speed achieved in accordance with the rotational speed of the carrier 11 and a gear ratio of the power distribution device 7.

When the engine 1 is stopped under the condition that the rotary members are rotated as indicated in FIG. 5 (*a*), the rotary members 15, 17 and 18, and the carrier 11 are stopped as indicated in FIG. 5 (*c*). Meanwhile, the rotational speed of the first motor-generator 2 is increased in the counter direction. Therefore, in case of stopping the engine 1 in the running vehicle under the direct drive stage, the electric power stored in the battery 5 is consumed by the motor-generators 2 and 3 in the amount of changes in the inertial energies resulting from changes in the rotary members.

Given that the engine 1 is stopped in the running vehicle under the speed increasing stage of the transmission 12 as indicated in FIG. 5 (*b*), the electric power stored in the battery 5 is also consumed to rotate the motor-generators 2 and 3 in the amount of changes in the inertial energies resulting from changes in the rotary members. Meanwhile, in case the engine 1 is stopped in the running vehicle under the speed increasing stage of the transmission 12, the first motor-generator 2 whose inertial force (i.e., a mass) is comparatively large is rotated at higher speed than that under the direct driving stage. That is, the amount of change in the rotational speed of the first motor-generator 2 when stopping the engine 1 under the speed increasing stage is larger than that under the direct drive stage. Therefore, a larger amount of the electric power is consumed as a result of stopping the engine 1 under the speed increasing stage in comparison with that under the direct drive stage.

Figure 6:
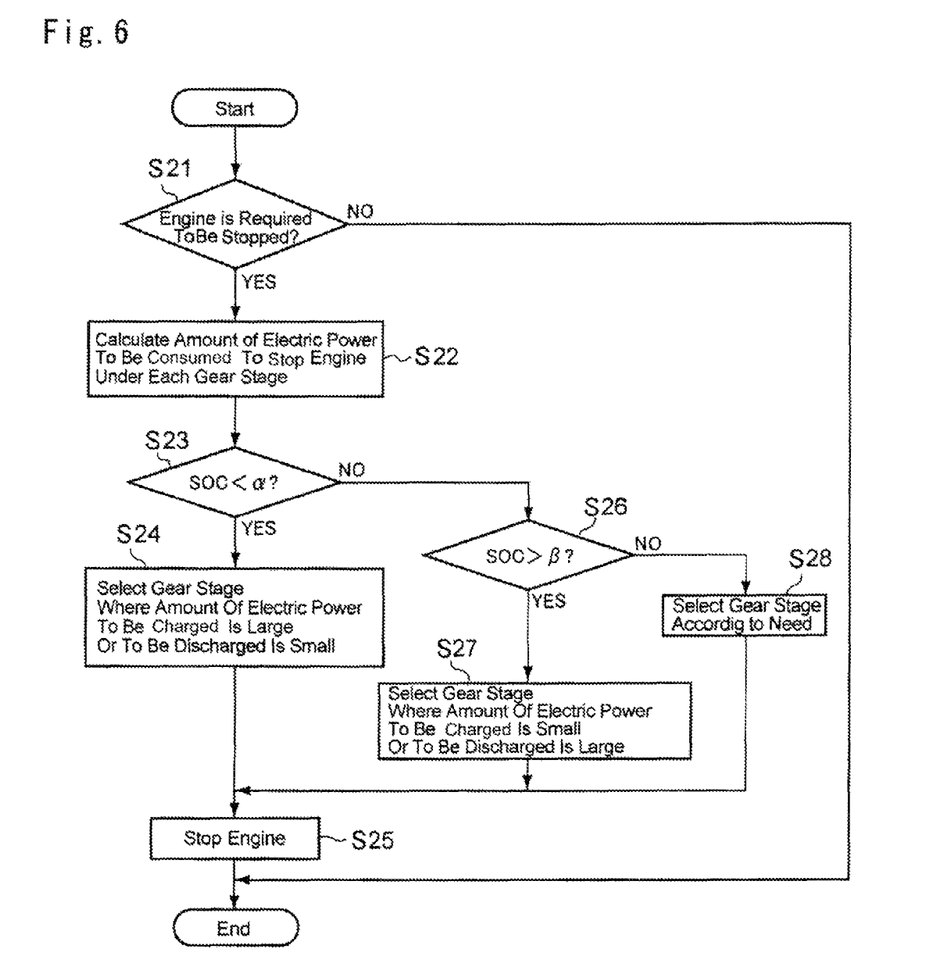
FIG. 6 is a flowchart showing a control example of the present invention for selecting a gear stage to stop the engine.

Thus, an amount of change in the electric power to be consumed or generated also differs depending on the speed ratio of the transmission 12 when stopping the engine 1. Therefore, an overcharging or an over discharging of the battery 5 may be caused when starting the engine 1 depending on the speed ratio. Otherwise, a voltage or a current higher than an allowable level may be applied to electronic equipment such as the battery 5 and the controller 4. In order to avoid such disadvantages, the control system of the present invention also changes a speed ratio of the transmission 12 when stopping the engine 1 in accordance with an SOC of the battery 5. A preferred example of such control is shown in FIG. 6. According to the example shown in FIG. 6, first of all, it is determined whether or not the engine 1 is required to be stopped (at step S21). For example, the control system determines a fact that the engine 1 is required to be stopped given that a condition to shift the drive mode from the HV mode to the EV mode where the engine 1 is to be stopped is satisfied.

If the engine 1 is not required to be stopped so that the answer of step S21 is NO, the routine is ended. In contrast, if engine 1 is required to be stopped so that the answer of step S21 is YES, an amount of the electric power to be consumed or generated to stop the engine 1 under each gear stage of the transmission 12 is individually calculated (at step S22). Specifically, the amount of the electric consumption or the electric power generation can be calculated by the same procedures as step S2 of FIG. 1. Then, it is determined whether or not the SOC of the battery 5 is lower than the lower limit threshold value α (at step S23). Such judgment of step S23 is carried out to avoid deterioration in durability of the battery 5 resulting from an over discharging caused by stopping the engine 1. If the SOC of the battery 5 is lower than the lower limit threshold value α so that the answer of step S23 is YES, the gear stage where the amount of electric consumption calculated at step S23 is smaller or where the amount of electric generation calculated at step S23 is larger is selected (at step S24). In other words, the gear stage where a discharging amount of the battery 5 is smaller or where a charging amount of the battery 5 is larger is selected. Specifically, the direct drive stage is selected under the situation shown in FIG. 4, and the speed increasing stage is selected under the situation shown in FIG. 5. Then, the engine 1 is started under the gear stage selected at step S24 (at step S25), and the routine is ended.

In contrast, if the SOC of the battery 5 is higher than the lower limit threshold value α so that the answer of step S23 is NO, it is determined whether or not the SOC of the battery 5 is higher than a predetermined upper limit threshold value β of the battery 5 (at step S26). Such judgment of step S26 is carried out to avoid deterioration in durability of the battery 5 resulting from an overcharging caused by stopping the engine 1. If the SOC of the battery 5 is higher than the upper limit threshold value β so that the answer of step S26 is YES, the gear stage where the amount of electric consumption calculated at step S26 is larger or where the amount of electric generation calculated at step S26 is smaller is selected (at step S27). In other words, the gear stage where a discharging amount of the battery 5 is larger or where a charging amount of the battery 5 is smaller is selected. Specifically, the speed increasing stage is selected under the situation shown in FIG. 4, and the direct drive stage is selected under the situation shown in FIG. 5. Then, the engine 1 is started under the gear stage selected at step S27 (at step S25), and the routine is ended.

If the SOC of the battery 5 is higher than the lower limit threshold value α but lower than the upper limit threshold value β so that the answer of step S26 is NO, the battery 5 will not be charged overly and the electric power stored in the battery 5 will not be consumed overly. That is, it is not necessary to shift the gear stage depending on the SOC of the battery 5. In this case, therefore, the gear stage may be selected arbitrarily (at step S28). Then, the engine 1 is started under the gear stage selected at step S28 (at step S5), and the routine is ended.

Thus, if the SOC of the battery 5 is expected to be out of the allowable range between the lower limit threshold value α and the upper limit threshold value β after stopping the engine 1, the control example shown in FIG. 6 stops the engine 1 while selecting the gear stage in a manner such that the SOC of the battery 5 is maintained within the allowable range, or that the SOC of the battery 5 is kept close to the threshold values. The control example shown in FIG. 6 may also be applied to the hybrid drive unit shown in FIG. 7 in which the gear stage is selected from more than three stages or a speed ratio is changed continuously. In this case, the control system also selects the gear stage when starting the engine 1 in a manner to maintain the SOC of the battery 5 within the allowable range.

As described, the amount of the electric power to be consumed or to be generated when stopping the engine 1 can be controlled by selecting the gear stage of the transmission 12 in accordance with the SOC of the battery 5. Therefore, an overcharging and an over discharging of the battery 5 will not be caused so that the battery 5 can be prevented from being damaged. In addition, a control amount and a control frequency of the electric power can be reduced so that the controller 4 and auxiliaries can be prevented from being damaged.

According to the foregoing examples, the speed ratio is thus changed in accordance with the SOC of the battery 5 when starting or stopping the engine 1. Alternatively, in order to prevent the controller 4 and auxiliaries from being damaged, the speed ratio may also be changed in a manner such that a voltage or a current applied to the controller 4 and auxiliaries will not exceed an allowable range.

What is claimed is:

1. A hybrid drive unit comprising:
   an engine;
   a motor having a generating function;
   a power distribution device adapted to perform a differential action among a first rotary element connected with the engine, a second rotary element connected with the motor, and a third rotary element connected with an output member;
   a transmission adapted to change a gear stage, the transmission having a plurality of gear stages, the transmission is arranged between the engine and the power distribution device;
   an electric storage device that is electrically connected with the motor; and
   an electronic control unit configured to:
   calculate an amount of an electric power to be stored into the electric power storage device and an amount of electric power to be discharged from the electric power storage device for each of the plurality of gear stages of the transmission,
   select the gear stage of the transmission where the amount of an electric power to be stored into the electric storage device is larger than the amount of the electric power to be stored in the electric storage device of the other of the plurality of gear stages or select the gear stage of the transmission where an amount of the electric power to be discharged from the electric storage device is smaller than the amount of the electric power to be discharged from the electric storage device of the other of the plurality of gear stages when a state of charge of the electric storage device is lower than a first threshold value, when starting or stopping the engine while transmitting a torque of the motor to the engine, and
   select the gear stage of the transmission where the amount of an electric power to be discharged from the electric storage device is larger than the amount of the electric power to be discharged from the electric storage device of the other of the plurality of gear stages or select the gear stage of the transmission where the amount of an electric power to be stored into the electric storage device is smaller than the amount of electric power to be stored into the electric storage device of the other of the plurality of gear stages when a state of charge of the electric storage device is higher than a second threshold value that is larger than the first threshold value, when starting or stopping the engine while transmitting a torque of the motor to the engine.

2. The control system for a hybrid drive unit as claimed in claim 1, wherein the electronic control unit is configured to calculate the amount of the electric power to be stored into or to be discharged from the electric storage device when starting or stopping the engine, based on an amount of change in a rotational speed of any of the rotary members connected with the power distribution device or the transmission.

3. The control system for a hybrid drive unit as claimed in claim 1, wherein the transmission includes a geared transmission comprising at least three rotary elements, that is adapted to establish a first gear stage by connecting any two of the rotary elements, and to establish a second gear stage by stopping a rotation of any one of the rotary elements.

4. The control system for a hybrid drive unit as claimed in claim 1, wherein the state of charge of the electric storage device includes a charging rate or a voltage in the electric storage device.

* * * * *